Sept. 5, 1939.  A. J. MUSSELMAN  2,171,886
TWO-SPEED COASTER BRAKE
Filed June 7, 1937  2 Sheets—Sheet 1

INVENTOR.
ALVIN J. MUSSELMAN
BY
Kwis Hudson & Kent
ATTORNEYS

Sept. 5, 1939.  A. J. MUSSELMAN  2,171,886
TWO-SPEED COASTER BRAKE
Filed June 7, 1937   2 Sheets-Sheet 2

INVENTOR.
ALVIN J. MUSSELMAN
BY Kwis Hudson & Kent
ATTORNEYS

Patented Sept. 5, 1939

2,171,886

UNITED STATES PATENT OFFICE 2,171,886

TWO-SPEED COASTER BRAKE

Alvin J. Musselman, Cleveland Heights, Ohio

Application June 7, 1937, Serial No. 146,727

9 Claims. (Cl. 74—290)

This invention relates to improvements in two speed coaster brakes, and has reference particularly to a simple compact mechanism which may be readily substituted for the conventional single speed drive mechanism, and which does not in any way alter the operation of the coaster or the brake.

One of the objects of the invention is the provision of a simple attachment unit which shall be interchangeable with the conventional single speed unit.

Another object is the provision of a simple and effective control means for shifting from high to low speed and vice versa.

Other objects and features of novelty will appear as I proceed with the description of that embodiment of the invention which, for the purposes of the present application, I have illustrated in the accompanying drawings, in which—

Figure 1:
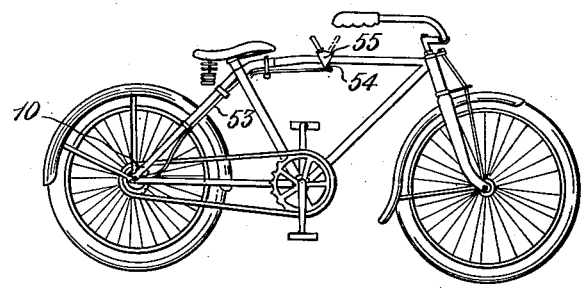
Fig. 1 is an elevational view of a bicycle equipped with the invention.

In the drawings 10 represents the rear forks of a bicycle frame, which are perforated to receive a rear axle 11 threaded for a distance at each of the opposite ends thereof. At one end of the axle there is fixedly mounted a bearing cone 12. Bearing balls 13 run between this cone and a race 14 formed in one end of the rear wheel hub 15. Mounted upon the axle inwardly of the cone 12 there is a spool 16 which supports a spring sleeve 17 having a tapered split to receive a wedge 18. When the latter is shifted to the left the sleeve 17 is spread and caused to grip the internal wall of the hub 15 to effect a braking action, rotation of the sleeve 17 being prevented by a lug 19 carried by the cone 12 projecting into the space within the ends of the sleeve. The large end of wedge 18 is engaged by a flange 20 on one end of spool 16. When the brake is to be set collar 21 pushes spool 16 to the left. The collar 21 also acts as a clutch to drive hub 15 in a forward direction when the bicycle rider is pedaling. To this end the outer surface of the collar is tapered, as shown, and when the collar 21 is shifted to the right this surface engages and grips a complementary internal surface on the hub 15. A spring ring 22 is secured to flange 20 on spool 16 and is adapted to yieldably engage the collar 21 when the rider stops pedaling. The collar 21 is thereby held in an intermediate position, which is the coasting position. At such times the hub turns freely on bearing balls 13 at one end and bearing balls 23 at the other end. All of the foregoing construction is known in the art, and is shown and described in some detail in my Patent 1,911,461, issued May 30, 1933.

The internal surface of collar 21 is provided with a coarse thread which fits upon a worm 24 that is formed integral with a planet carrier 25 that has a peripheral flange 26. The carrier 25 is provided with three cylindrical bosses 27 spaced 120° apart, upon which are mounted for rotation three planet pinions 28. The carrier 25 is also provided with an inner race for the balls 23. Pinions 28 mesh with an internal orbit gear 29 on sprocket wheel 30, which is in reality a ring. It has a three point support upon the pinions 28. No other bearing is necessary. This arrangement not only saves the cost of providing such an additional bearing, but also it saves space axially of the hub, which is extremely important.

Figure 5:
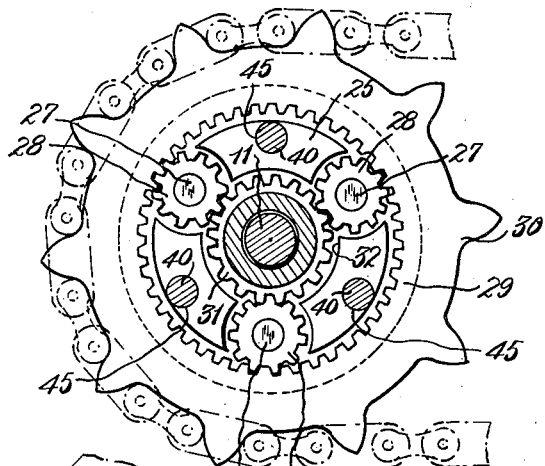
Fig. 5 is an end elevational view, partly in section upon the line 5—5 of Fig. 2.

A sun gear 31 surrounds the shaft 11 and extends into a central pocket 32 in the carrier 25, abutting against a washer 33. The sun gear meshes with pinions 28, as clearly shown in Fig. 5. It has a hub which is rigidly connected with an element 34 that has a peripheral flange 35 set in close proximity to the sprocket wheel 30, and serving with flange 26 to prevent movement of the sprocket wheel longitudinally of the hub. Element 34 also comprises a horizontal part with a cylindrical outer surface 36 and an internal ball race 37. The latter runs upon balls 38 that are supported upon a cone member 39 that is threaded upon axle 11 for adjustment purposes. The threading of the cone 39 inwardly takes up looseness in all of the ball bearings, the cone 12 being fixed at the end of the axle opposite to the adjustable cone 39. When this occurs the worm 24, which has a rotative bearing upon the axle, slides longitudinally thereupon.

Figure 2:
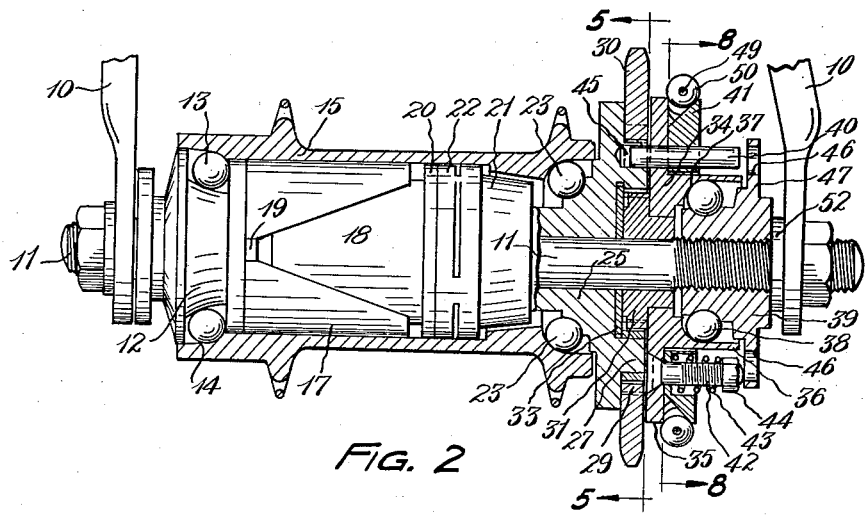
Fig. 2 is a sectional view on a larger scale of the rear hub of a bicycle in which the invention is embodied, and showing the transmission in direct drive.

Flange 35 is provided with a series of three perforations evenly spaced in which pins 40 are mounted to slide. The pins 40 are fixed in a disk 41 which has a large central opening sufficient to clear the cylindrical surface 36 on element 34. The disk 41 is also provided with holes to receive pins 42 that are mounted in flange 35. The outer side of disk 41 is counterbored to receive a coil spring 43 surrounding each of the pins 42, and a nut 44 is threaded onto the end of each pin to adjust the tension of these springs. The springs of course tend to hold disk 41 up against flange 35, as shown in Fig. 2. When the disk is in this position the pins 40 extend through the flange 35 into sockets 45 formed in carrier 25. When the disk 41 is in the position of Fig. 3 the pins 40 are withdrawn from sockets 45, but their opposite ends project into holes 46 formed in a flange 47 on the adjusting cone 39, which is fixed after the desired adjustment is made.

Figure 6:
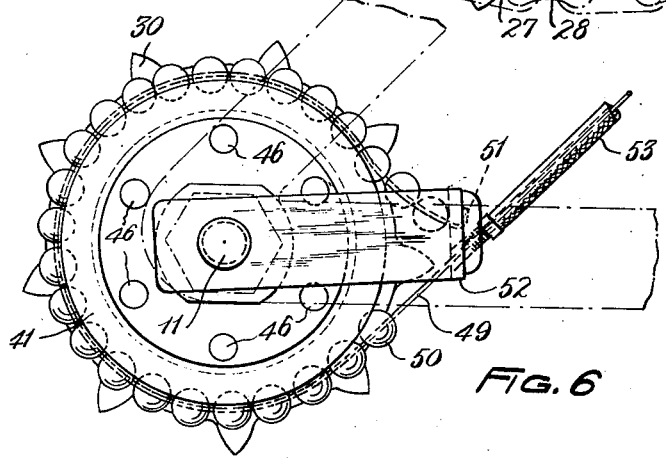
Fig. 6 is an end elevation of the transmission unit showing the manual control means for shifting gears.

The means which I prefer to employ for shifting disk 41 to the right against the action of springs 43 is as follows. The disk 41 is beveled off on its inner side, as at 48. In the groove which is thus formed between disk 41 and flange 35 I employ a contractible loop. The radius of this loop becomes smaller as the loop is contracted and the disk is thereby wedged outward. According to my preferred construction this loop is formed from a small Bowden wire or cable 49 upon which are strung a series of perforated metal balls 50. The cable is anchored at one end, as shown at 51, Figs. 6 and 8, in a bracket 52 which is carried upon the axle 11. Beyond the bracket this cable extends through a tubular flexible sheath 53 that extends upwardly along the frame members of the bicycle, as illustrated in Fig. 1. The opposite extremity of the cable is attached to a small lever 54 pivoted in a bracket 55 which is secured to the upper frame bar in a convenient position for operation by the rider of the bicycle. The bracket 55 has incorporated therein some suitable means (not shown) for holding the lever 54 in the position corresponding with the contracted condition of the cable loop, since this condition is opposed by the springs 43.

Figures 7, 8:
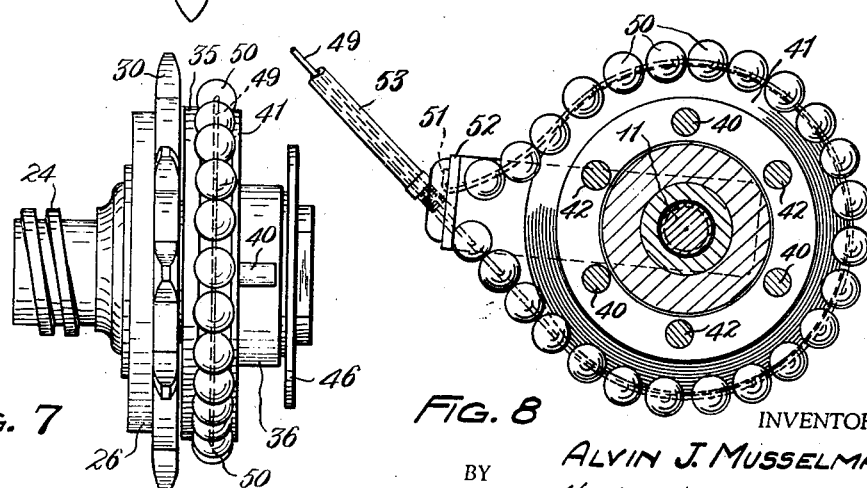
Fig. 7 is a view similar to Fig. 4 of the interchangeable two speed unit.
Fig. 8 is a sectional view taken substantially on the line 8—8 of Fig. 2.

*Operation.*—The transmission unit is shown complete in Fig. 7. Assuming that this unit is in place in the rear hub of a bicycle in conjuncton with a coaster brake, and that the rider wishes to proceed forward in high speed, he then moves lever 54 from the position shown in Fig. 1 in full lines to that shown in dotted lines. Tension upon the cable 49 is thus relieved, and the springs 43 act to shift disk 41 to the position of Fig. 2. In this position the pins 40 lock sun gear 31 to planet carrier 25, preventing movement between the sun gear and the planet gears. Since the planet gears cannot then turn on their axes the internal orbit gear is also locked against relative rotation with respect to the planet gears. In other words the planetary system is locked against operation and can revolve only as a unit. Force applied by the rider to turn the sprocket wheel 30 in a forward direction therefore turns planet carrier 25 and worm 24 in that same direction. The first effect is to draw the collar 21 to the right, clutching it to hub 15, after which the hub turns with the transmission. Now, should the rider wish to proceed in low speed, as for example when he encounters a hill or a soft piece of road, he then shifts lever 54 to the full line position of Fig. 1, thereby contracting the cable loop and pulling the balls 50 toward the axle. This withdraws pins 40 from sockets 45 in the planet carrier and pushes them toward the right against the flange 47. As soon as the pins come opposite certain of the holes 46 in the flange they enter these holes, thereby bringing flange 35 and the sun gear 31 to a stop. Now internal gear 29 on the sprocket wheel rotates pinions 28, which must revolve around stationary sun gear 31. By this means rotation is imparted to planet carrier 25 at a lower rate of speed.

In low gear, as well as in high gear, the coasting and braking action of the coaster brake remains unchanged. In other words, when the rider stops pedaling the collar 21 is shifted slightly toward the left sufficiently to disengage the clutching surfaces, whereupon the hub 15 revolves freely upon the two sets of balls 13 and 23. Then when the rider back-pedals, collar 21 is shifted further toward the left and pushes on flange 20, causing wedge 18 to move to the left and set the brake.

Figures 3, 4:
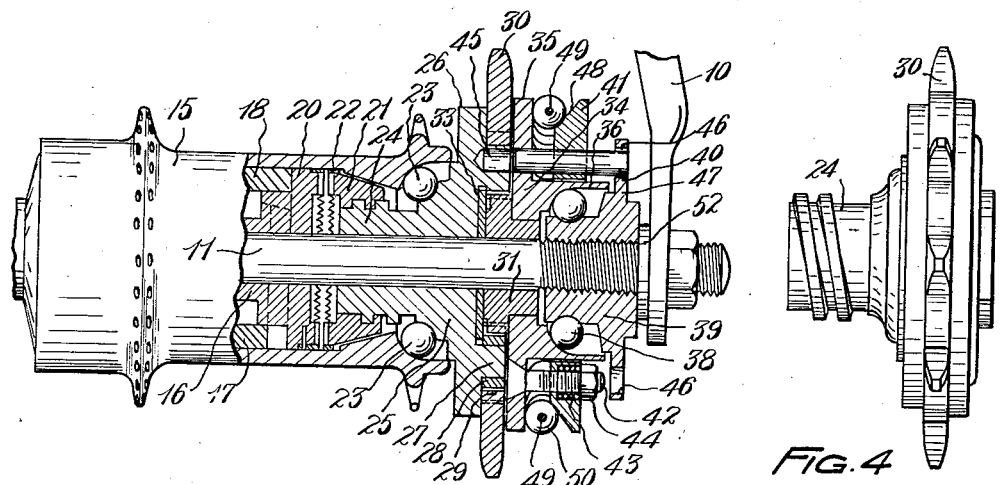
Fig. 3 is a section corresponding to Fig. 2 but with the brake revolved 90°, and showing the transmission in low speed position.
Fig. 4 is an elevational view of a single speed transmission unit interchangeable with the two speed unit.

In Fig. 4 a single speed transmission unit is illustrated. It has precisely the same worm 24 as the two speed. Hence the one may be substituted for the other without in any way altering the units themselves. The difference in the length of the hub is slight, and is easily accommodated by the springiness of the bicycle frame.

I have described the preferred construction somewhat in detail, but it is to be understood that minor changes may be made without departing from the spirit of the invention. For instance a different number of pins 40 may be employed, and it is not essential that the same pin that enters a socket 45 shall also enter a hole 46. Some pins may be caused to project in one direction, and others in another direction. Numerous possible changes will be apparent to those skilled in the art. Accordingly I desire it to be understood that the scope of the invention is to be regarded as defined exclusively by the appended claims rather than by the foregoing description.

Having thus described my invention, I claim:

1. In a two speed transmission for bicycles, a planetary reduction gearing capable of being locked together to revolve as a whole for direct drive, a disk concentric with said gearing having a beveled face, a pin carried by said disk projecting through a hole in one of the gearing elements, a stationary member having a hole therein to receive said pin when the disk is shifted in one direction, another of said gearing elements having a socket therein to receive said pin when the disk is shifted in the opposite direction, means movable radially inward in engagement with said beveled face for shifting the disk in one direction, and spring means tending to shift it in the opposite direction.

2. In a two speed transmission for bicycles, a planetary reduction gearing capable of being locked together to be revolved as a whole for direct drive, one element of said gearing carrying a flat sided annular flange, a disk concentric with said flange, said disk having a beveled face on the side toward said flange, a pin carried by said disk projecting through a hole in said flange, a stationary member having a hole therein to receive said pin when the disk is shifted in one direction, another of said gearing elements having a socket therein to receive said pin when the disk is shifted in the opposite direction, a contractible flexible element arranged in the groove formed between said flange and said beveled face for shifting the disk in one direction when the flexible element is contracted, and spring means tending to move the flange and disk toward each other.

3. In a two speed transmission for bicycles, a planetary reduction gearing capable of being locked together to be revolved as a whole for direct drive, one element of said gearing carrying a flat sided annular flange, a disk concentric with said flange, said disk having a beveled face on the side toward said flange, a pin carried by said disk projecting through a hole in said flange a stationary member having a hole therein to receive said pin when the disk is shifted in one direction, another of said gearing elements having a socket therein to receive said pin when the disk is shifted in the opposite direction, a contractible flexible element arranged in the groove formed between said flange and said beveled face for shifting the disk in one direction when the flexible element is contracted, and spring means tending to move the flange and disk toward each other, said flexible element comprising a cable and a series of perforated balls through which the cable extends.

4. A planetary transmission for bicycles, comprising a planet gear carrier, three planet gears rotatably mounted on said carrier, a sun gear meshing with said planet gears, a sprocket wheel of annular form having an internal gear meshing with said three planet gears and having its bearing upon the teeth of said planet gears exclusively, and means for holding said sprocket wheel and internal gear against axial movement.

5. A planetary transmission for bicycles, comprising a planet gear carrier with a circular peripheral flange, three planet gears rotatably mounted on said carrier, a sun gear meshing with said planet gears, said sun gear having a circular flange extending up past said planet gears opposite said first named flange, and a sprocket wheel of annular form mounted between said flanges and having an internal gear meshing with said three planet gears and having its bearing upon the teeth of said planet gears exclusively.

6. In a two speed transmission for bicycles, a planetary reduction gearing capable of being locked together to be revolved as a whole for direct drive, one element of said gearing carrying a flat sided annular flange, a disk concentric with said flange, said disk having a beveled face on the side toward said flange, a pin carried by said disk projecting through a hole in said flange, a stationary member having a hole therein to receive said pin when the disk is shifted in one direction, another of said gearing elements having a socket therein to receive said pin when the disk is shifted in the opposite direction, a contractible flexible element arranged in the groove formed between said flange and said beveled face for shifting the disk in one direction when the flexible element is contracted, and spring means tending to move the flange and disk toward each other, said flexible element comprising a cable anchored at one end and extending around said groove and up to a control member conveniently located for operation by the rider.

7. In a two-speed transmission for bicycles, planetary gearing comprising a sun gear, planet gears and an internal gear all in the same plane, a planet carrier upon which said planet gears are journaled, an annular offset flange on said sun gear extending outwardly alongside said planet carrier, a disk concentric with said gearing arranged on the opposite side of said flange and movable toward and away from said flange, a pin mounted in said disk extending through a hole in said flange, a stationary element having a hole therein to receive said pin when the disk is shifted away from the flange, said planet carrier having a socket therein to receive the opposite end of the pin when the disk is shifted toward the flange, and means under the control of the operator for moving said disk in either direction.

8. In a two-speed transmission for bicycles, planetary gearing comprising a sun gear, three planet gears and an internal gear all in the same plane, a planet carrier upon which said planet gears are journaled 120° apart, an annular offset flange on said sun gear extending outwardly alongside said planet carrier, a disk concentric with said gearing arranged on the opposite side of said flange and movable toward and away from said flange, three pins mounted in said disk 120° apart extending through similarly spaced holes in said flange, a stationary element having holes therein to receive said pins when the disk is shifted away from the flange, said planet carrier having three sockets therein spaced between said planet gears to receive the opposite ends of said pins when the disk is shifted toward the flange, and means under control of the operator for moving said disk in either direction.

9. In a two-speed transmission for bicycles, planetary gearing comprising a sun gear, planet gears and an internal gear all in the same plane, a planet carrier upon which said planet gears are journaled, an annular offset flange on said sun gear extending outwardly alongside said planet carrier, a disk concentric with said gearing arranged on the opposite side of said flange and movable toward and away from said flange, a pin mounted in said disk extending through a hole in said flange, a stationary element having a hole therein to receive said pin when the disk is shifted away from the flange, said planet carrier having a socket therein to receive the opposite end of the pin when the disk is shifted toward the flange, spring means tending to draw said disk toward said flange, and wedge means under the control of the operator and functioning on opposite sides of the axis of the disk for moving the disk away from said flange.

ALVIN J. MUSSELMAN.